United States Patent Office 2,786,241
Patented Mar. 26, 1957

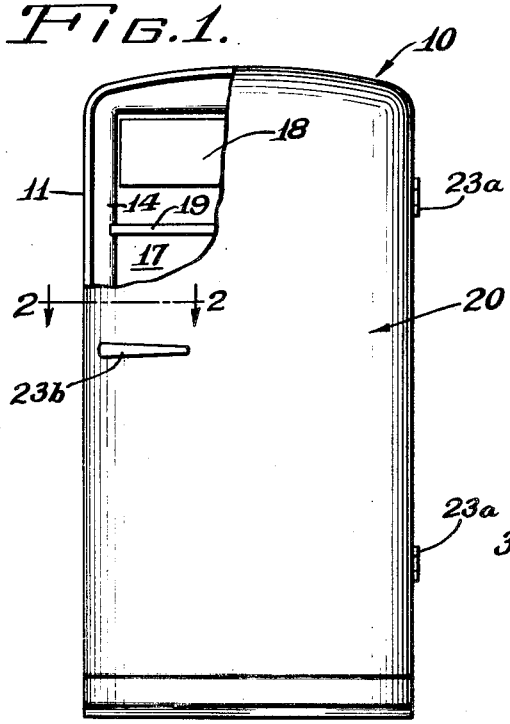
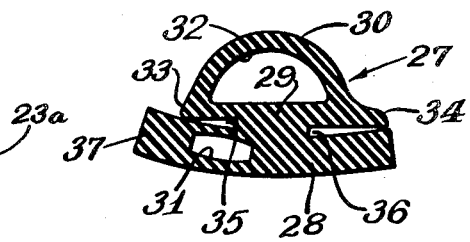
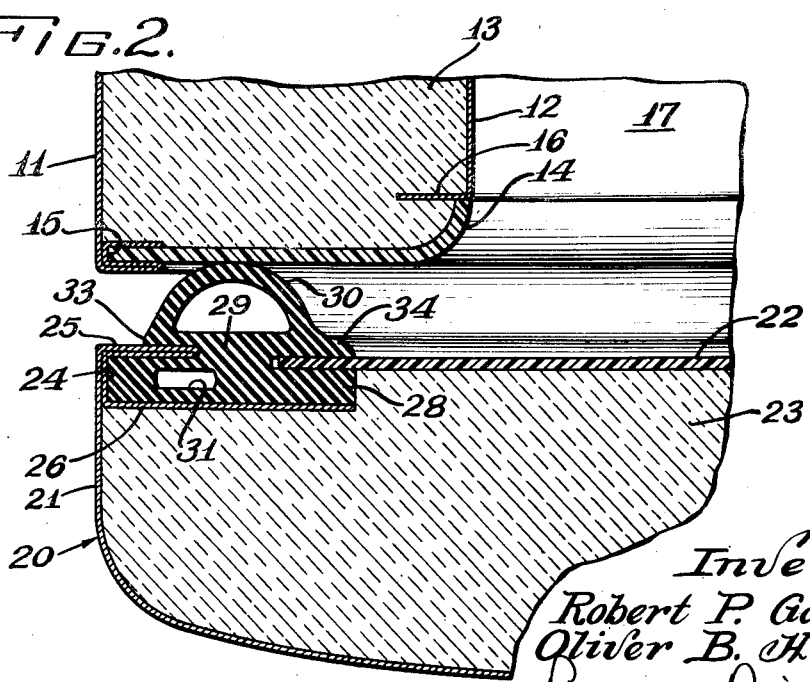
March 26, 1957 — R. P. GARVEY ET AL — 2,786,241
REFRIGERATOR DOOR AND GASKET SEAL
Filed June 2, 1954
Inventors:
Robert P. Garvey
Oliver B. Hall
Atty.

2,786,241

REFRIGERATOR DOOR AND GASKET SEAL

Robert P. Garvey and Oliver B. Hall, Evansville, Ind., assignors, by mesne assignments, to Whirlpool-Seeger Corporation, a corporation of Delaware Application June 2, 1954, Serial No. 433,899

1 Claim. (Cl. 20—35)

This invention relates to refrigerating apparatus generally, but more particularly to a door or closure structure and to the gasket sealing means employed to tightly seal said door or closure member over the access opening of a refrigerated cabinet.

Frequently, in structures of this character the door is designed to incorporate a resilient gasket-like sealing member that is fashioned to perform a dual function in that it operates to seal or close off any space or gap between the door and the cabinet particularly adjoining the access opening thereof, and to provide a heat-break connecting member between inner and outer panels of the door or closure member. In view of the two-fold employment of such gasket it is generally designed or fashioned to coact with a particular door structure so that when such structure is changed or reconstructed, a new sealing gasket member is most usually required for the modified structure.

Heretofore many different door structures and a variety of sealing gasket devices have been combined into arrangements suitable for accomplishing the objectives of such structures but, for one reason or another, few such arrangements as have been proposed have ever received any ready or universal acceptance in the industry.

It is a principal object of this invention, therefore, to provide an improved door structure that is simple and inexpensive to construct and which incorporates a sealing means therein that is highly effective for providing a good seal when the door is positioned over the access opening of a refrigerated cabinet.

An important object of the invention is to provide a refrigerator cabinet door structure formed with a yoder roll section and having spaced apart outer and inner panels that are secure together along their marginal edges by a low-heat-conducting resilient member, which member additionally functions as a gasket seal around the cabinet access opening when the door is closed thereover.

Another object is to provide an improved refrigerator cabinet door structure wherein the inner and outer panels are removably fastened together without the aid of screws and similar conventional fastening devices but wherein the fastening means employed additionally provides a heat-break between said panels.

A further object is to provide a door structure having inner and outer panels with heat insulation therebetween and wherein the marginal edges of said panels are removably fitted into oppositely extending portions of a low-heat-conducting combination connecting a gasket sealing member.

A still further object is to provide a resilient low-heat-conducting member adapted for positioning between and for fastening together the marginal edges of spaced panels in a door structure, and which member includes a balloon-like section extending therefrom that functions as a gasket seal around the access opening of a cabinet when said door closes the opening.

A yet still further object is to provide a refrigerator door with a resilient gasket sealing member having slotted recesses or channels along opposite sides thereof and which slots are adapted to receive marginal edge portions of the inner and outer panels of said door for maintaining said panels spaced apart and in fixed relation with respect to one another.

Another important object is to provide a low-heat-conducting resilient sealing gasket which is fashioned so that one edge portion thereof is adapted to be received in a tight frictionally engaging relationship in a channel formed along the marginal edge of a door outer panel, and another edge portion having a slot therein that is adapted to receive in frictionally engaging relationship a marginal edge of the door inner panel, while an additional hollow-center portion thereof engages the surface of a cabinet to seal an access opening therein.

Further objects and advantages of the present invention will be apparent from the full description, reference being had to the accompanying drawing in which:

Figure 1 is a front view of a refrigerator cabinet embodying the present invention and showing a portion of the cabinet door broken away;

Figure 2 is an enlarged fragmentary sectional view taken on line 2—2 of Figure 1 and showing the cabinet door in a closed position; and Figure 3 is a cross-sectional view of the sealing gasket of the present invention.

Referring now to the drawing, it will be noted that in the preferred embodiment depicted therein there is illustrated a generally conventional household-type refrigerator cabinet into which the present invention has been incorporated. This cabinet, represented generally by the reference character 10, is fashioned with an outer shell or casing 11 that surrounds an inner shell or liner 12 which is spaced therefrom by the heat insulating material 13. A breaker strip 14 is fashioned from a suitable low-heat conducting material, such as any one of many of the well-known plastic compositions, is disposed so as to join marginal edges of the inner and outer shells and at the same time cover over the heat-insulating material positioned therebetween. Said breaker strip member 14 may be so contoured that one edge portion thereof fits into a channel 15 formed along the marginal edge of the outer shell 11 while an opposite edge portion rests on an inwardly turned flange 16 formed along the marginal edge of the inner liner 12. A food storage compartment 17 is formed within the inner shell 12 and disposed therewithin is an evaporator cooling unit 18 and a plurality of shelves 19 (only one of which is shown). Said evaporator cooling unit is, of course, part of a conventional refrigeration system the details of which have been omitted from the drawing since the particular system forms no specific part of the invention.

In accordance with the present invention there is provided a door or closure member, represented generally by the reference character 20, which is fashioned with an outer pan or panel 21 and an inner pan or panel 22 spaced therefrom with heat insulating material 23 disposed therebetween and which is mounted by suitable means such as the hinges 23a and latch mechanism 23b on the cabinet 10. The outer pan 21 is fashioned from a metallic material while the inner panel 22 is fashioned from a suitable low-heat conducting material such, for instance, as any one of the well known plastic compositions commonly used for such purposes. The marginal edge of said outer pan 21 is bent back upon itself and then inwardly turned to provide a channel 24 flanked on one side by a double thickness flange or ledge 25 and on the other by a single thickness flange or ledge 26. It will be noted the flange 26 extends inwardly a somewhat greater distance than does the opposite flange 25 the purpose of which will presently be better understood. The outer pan section that includes the channel 24 and adjoining flanges 25 and 26 is known as a yoder roll section because it is fabricated on a yoder roll machine. It will be appreciated however, that, although this is the preferred manner for forming this particular channel section, such channel may be otherwise formed without deviating from the spirit or concepts of the present invention.

In order to effectuate the further concepts of the present invention it is proposed to employ a gasket sealing member, as indicated generally by the reference numeral 27, fashioned from a suitable low-heat-conducting and resilient material such as that which is provided by any one of many of the well-known vinyl plastic compositions now on the market. Said gasket member, which is dimensioned to extend, preferably, continuously in a picture-frame-like arrangement along the entire length of the marginal edges of said inner and outer door pans, is formed with a base or body-like portion 28 connected by an integrally formed neck-like portion 29 to a cabinet engaging hollow-centered or balloon-like portion 30. The base 28 is provided with a hollowed-out section 31 extending the full length thereof which serves to aid in increasing flexibility of the gasket and to assist in relieving stresses therein during use. The balloon or hollow cushion-like portion 30 is generally semi-circular in shape and the center thereof is hollow, as shown at 32. Outwardly directed lip-like protrusions 33 and 34 extending along opposite edges of said hollow cushion portion overlap, but because of the neck 29 are spaced from the base portion 28 a distance sufficient to provide slot-like openings or recesses 35 and 36 that extend longitudinally along opposite sides of the gasket member. The cross-sectional view illustrated in Figure 3 shows a view of the proposed gasket in its free or non-constrained position and it will be noted that in this position the slot-like grooves or channels 35 and 36 are closed at their mouths or outer ends while the base portion 28 assumes a slightly curved contour. This arrangement serves to keep opposite walls of each of said grooves biased toward one another and thus tightly press against the door panel members when positioned therewithin.

In assembling the proposed door structure so as to incorporate the gasket 27 therein an edge portion 37 of the base of said gasket member is insertably pressed into the channel 24 and the flange 25, of the outer door pan 21, is fitted into the slot-like recess or channel 35. In this manner the gasket is fixedly positioned around a marginal edge portion of the outer door pan and simultaneously therewith the base portion 28 of said gasket member is supportably positioned against the flange 26 of said outer door pan. With the gasket thus positioned the inner panel member 22 of the door may then be inserted into the channel or slot-like groove 36. In order to assist the assembly in this operation the lip 34 of the gasket may be bent back out of the way and temporarily held there while the panel 22 is positioned in the channel after which the lip may be released and permitted to fall naturally into position against the upper face of said inner panel. When thus positioned the gasket will appear substantially as indicated in Figure 2 and the base portion thereof will snugly lie against the flat ledge or flange 26 while the inner panel 22 is fixedly positioned in spaced relation to the outer pan 21 of the door.

When the door 20 is closed by means of the hinges 23a over the access opening of the cabinet the balloon-like portion 30 of the gasket member 27 will engage in abutting relation the breaker strip member 14 and thus seal off any ingress or egress of air to the food storage compartment 17. If desired, of course, to assure a tighter seal the hinges and latching mechanism may be adjusted so that the gasket is pulled up closer to the breaker strip. In this case the hollow-cushion portion 30 will be deformed thus causing a greater portion of the surface thereof to engage the breaker strip 14 and as a result thereof improving the air and moisture seal around the opening. Because of the hollow center construction and the resilient nature of the material the gasket will, of course, return without any permanent set or damage to its natural condition as soon as the pressure is removed therefrom.

From the foregoing it should now be apparent that a novel and improved door and gasket construction for a refrigerator cabinet has been shown and described, and it is to be understood that changes may be made in the construction without departing from the spirit of the invention or the scope thereof as defined in the appended claim.

We claim:

A combined door seal and breaker strip assembly comprising a refrigerator door having an outer shell and an inner panel separated by insulation, said shell being formed with an outer face portion, a rearwardly extending edge portion, and an inwardly extending flange portion, said flange portion being bent back upon itself and having a forwardly extending portion engaging the inside of the edge portion and terminating in a wide inwardly extending flange parallel to said inwardly extending flange portion and forming a groove which is rectangular in cross section, and a resilient rubber member having a hollow compressible base portion fitting in said groove and extending inwardly to the edge of said wide flange, said base portion having a rectangular groove for receiving, gripping and supporting the edge of said inner panel without other securing means, said base portion having an integral body between said inner panel edge and the outer shell back bend, which has a groove fitting and gripping said back bend, said body having an integral hollow sealing portion provided with an outer convexly curved sealing surface and an inner half round cavity.

References Cited in the file of this patent

UNITED STATES PATENTS

| 2,212,964 | White | Aug. 27, 1940 |
| 2,215,889 | Swedman | Sept. 24, 1940 |
| 2,366,894 | Ellsworth | Jan. 9, 1945 |
| 2,507,305 | Jacobs | May 9, 1950 |